United States Patent [19]

Miyazawa et al.

[11] Patent Number: 4,940,342
[45] Date of Patent: Jul. 10, 1990

[54] COMPRESSOR WITH A RADIAL BEARING FOR SUPPORTING A DRIVE SHAFT

[75] Inventors: Kiyoshi Miyazawa, Annaka; Shigemi Shimizu, Sakai, both of Japan

[73] Assignee: Sanden Corporation, Gunma, Japan

[21] Appl. No.: 207,219

[22] Filed: Jun. 16, 1988

[30] Foreign Application Priority Data

Jun. 16, 1987 [JP] Japan .................. 62-91333[U]

[51] Int. Cl.⁵ .................. F16C 33/58; B25B 27/06; F01C 1/00; F04B 1/12
[52] U.S. Cl. ........................... 384/510; 29/724; 384/515; 384/559; 417/269; 418/55.4
[58] Field of Search ............... 384/456, 510, 513, 515, 384/519, 537, 559–562, 584, 585; 417/269; 418/55; 29/244, 255, 724

[56] References Cited

U.S. PATENT DOCUMENTS

| 1,363,705 | 12/1920 | Andrus | 384/519 |
| 3,302,986 | 2/1967 | Grolman et al. | |
| 3,712,759 | 1/1973 | Olson, Jr. | 417/269 |
| 3,838,942 | 10/1974 | Pokorny | 417/269 |
| 3,945,765 | 3/1976 | Toyoda et al. | 417/269 |
| 4,005,948 | 2/1977 | Hiraga et al. | 417/267 |
| 4,259,043 | 3/1981 | Hidden et al. | 418/55 |
| 4,303,379 | 12/1981 | Hiraga et al. | 418/55 |
| 4,314,796 | 2/1982 | Terauchi | 417/294 |
| 4,340,339 | 7/1982 | Hiraga et al. | 418/55 |
| 4,412,705 | 11/1983 | Schreiner | 384/584 |
| 4,512,729 | 4/1985 | Sakamoto et al. | 418/55 |
| 4,545,746 | 10/1985 | Sugimoto et al. | 418/55 |
| 4,547,138 | 10/1985 | Mabe et al. | 418/55 |
| 4,561,832 | 12/1985 | Shimizu | 418/55 |
| 4,701,115 | 10/1987 | Shimizu et al. | 418/55 |

FOREIGN PATENT DOCUMENTS

| 535830 | 1/1957 | Canada . | |
| 0069531 | 1/1983 | European Pat. Off. . | |
| 0087895 | 9/1983 | European Pat. Off. | 29/724 |
| 623229 | 12/1935 | Fed. Rep. of Germany . | |
| 832880 | 7/1949 | Fed. Rep. of Germany | 29/724 |
| 2606648 | 8/1977 | Fed. Rep. of Germany | 29/724 |
| 2391863 | 12/1978 | France . | |
| 61-99723 | 5/1986 | Japan . | |
| 361264 | 11/1931 | United Kingdom | 384/559 |
| 716727 | 10/1954 | United Kingdom | 29/724 |

Primary Examiner—Thomas R. Hannon
Attorney, Agent, or Firm—Banner, Birch, McKie & Beckett

[57] ABSTRACT

A compressor includes a housing having a first casing which encloses a compression mechanism and a second casing releasably attached to one end of the first casing. The second casing supporting a pair of bearings which in turn rotatably support a drive shaft. The first one of the bearings is positioned adjacent the first casing and the second bearing is spaced therefrom toward the driven end of the drive shaft. A sealing mechanism is disposed about the drive shaft and between the bearings for sealing the compressor housing and preventing refrigerant or lubricating oil from leaking therefrom.

The second bearing includes a gripping mechanism on the outermost radial surface thereof. The gripping mechanism is preferably an annular groove formed in the outermost radial surface of the bearing. Therefore, it is not necessary to remove the casing which supports the bearing from the bearing before pulling the bearing off of the shaft. Furthermore, the sealing mechanism may be replaced without separating the first and second casings.

15 Claims, 2 Drawing Sheets

COMPRESSOR WITH A RADIAL BEARING FOR SUPPORTING A DRIVE SHAFT

TECHNICAL FIELD

This invention relates to a compressor, and more particularly, to a compressor with a radial bearing for supporting a drive shaft wherein the radial bearing is provided with a mechanism which extends from the bearing housing and enables removal of the bearing without removing the casing that houses the bearing.

BACKGROUND OF THE INVENTION

FIG. 1 depicts the construction of a conventional scroll type compressor. Compressor 1 includes compressor housing 10 which comprises first cup-shaped casing 12 and second casing including front end plate 11 and tubular front boss 16. One end of first casing 12 is attached to one end surface of front end plate 11. A drive and compression mechanism are contained in a portion of compressor housing 10 defined by front end plate 11 and first casing 12.

Opening 111 receives one end of drive shaft 13 and is formed in the center portion of front end plate 11. One end of drive shaft 13 is fixedly connected to annular disc 14 which is rotatably supported in radial bearing 15. Radial bearing 15 is fixedly disposed in opening 111. The other end of drive shaft 13 extends through tubular front boss 16 which is fixedly secured on the other end surface of front end plate 11 by bolts 17. Radial bearing 18 is fixedly disposed on the inner surface of tubular front boss 16 for rotatably supporting the other end of drive shaft 13. Shaft seal mechanism 19 is disposed between the inner surface of tubular front boss 16 and the outer surface of drive shaft 13, and is adjacent to front end plate 11. Seal mechanism 19 seals the interior of compressor housing 10 from radial bearing 18, thereby preventing refrigerant and lubricating oil therein from leaking through tubular boss 16 to the outside of compressor 1.

Shaft seal mechanism 19 undergoes severe wear and breaks down more frequently than most any other part of the compressor. Consequently, shaft seal mechanism 19 is more frequently replaced than those other parts. Accordingly, it is desirable to enable one to easily replace shaft seal mechanism 19. However, replacement of shaft seal mechanism 19 embodied in the aforementioned compressor involves a series of complicated steps briefly described hereafter. The securement between front boss 16 and front end plate 11 is first released by unfastening bolts 17. Front boss 16 is then separated from front end plate 11. While pulling front boss 16 from front end plate 11, an annular shelf on the inner surface of front boss 16 pushes radial bearing 18 so that both front boss 16 and bearing 18 are removed from shaft 13 when front boss 16 is separated from front end plate 11. Shaft seal mechanism 19 is then removed from drive shaft 13. After a new seal mechanism is positioned on shaft 13, bearing 18 and boss 16 must be remounted.

The above replacement process is complicated and time consuming resulting in undesirable repair and maintenance costs. Furthermore, front boss 16 and front end plate 11 are separate components which require further assembly steps during the manufacture of the compressor. Consequently, the two component design can be cost ineffective for manufacturing process.

SUMMARY OF THE INVENTION

It is a primary object of the present invention to provide a compressor with a radial bearing for supporting a drive shaft wherein the bearing is readily removable so that repair or routine maintenance costs may be reduced.

It is another object of the present invention to provide a compressor with a casing for housing a radial bearing wherein the casing is formed as a single component thereby reducing the higher inventory costs related to multiple component casings.

It is a further object of the present invention to provide a compressor with a casing for housing a bearing wherein the casing is formed as a single component so that the greater number of manufacturing steps related to multiple component casing designs may be reduced thereby reducing manufacturing costs.

A compressor according to the present invention includes a housing having a first casing which encloses a compression mechanism and a second casing releasably attached to one end of the first casing. The second casing supports a pair of bearings which in turn rotatably support a drive shaft. The first one of the bearings is positioned adjacent the first casing and the second bearing is spaced therefrom toward the driven end of the drive shaft. A sealing mechanism is disposed about the drive shaft and between the bearings for sealing the compressor housing and preventing refrigerant or lubricating oil from leaking therefrom.

The second bearing includes a gripping mechanism on the outermost radial surface thereof for gripping the second bearing during removal thereof. Therefore, it is not necessary to remove the casing which supports the bearing from the bearing before pulling the bearing off of the shaft. Furthermore, the sealing mechanism may be replaced without separating the first and second casings.

Further objects, features and other aspects of this invention will be understood from the following detailed description of the preferred embodiment of this invention with reference to the annexed drawings.

DETAILED DESCRIPTION OF THE PREFERRED EMBODIMENT

Figure 1:
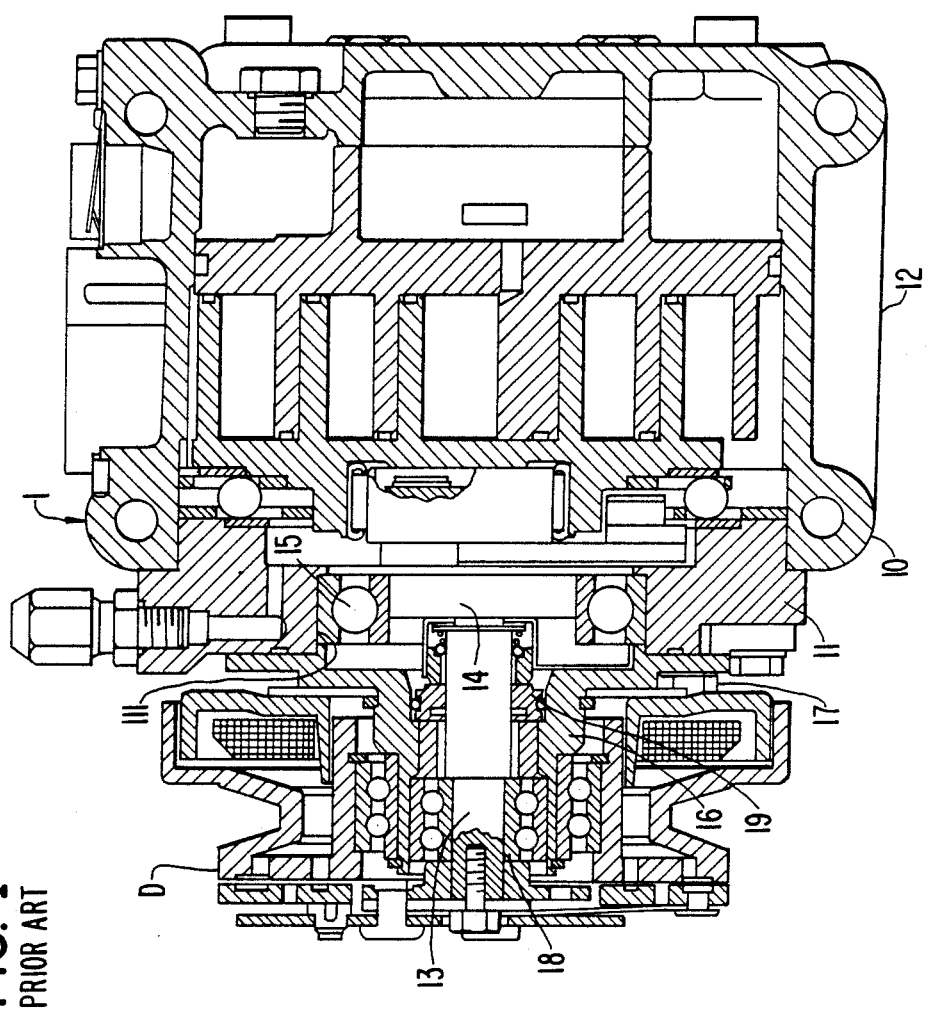
FIG. 1 is a cross-sectional view of a conventional scroll type compressor.
Figure 2:
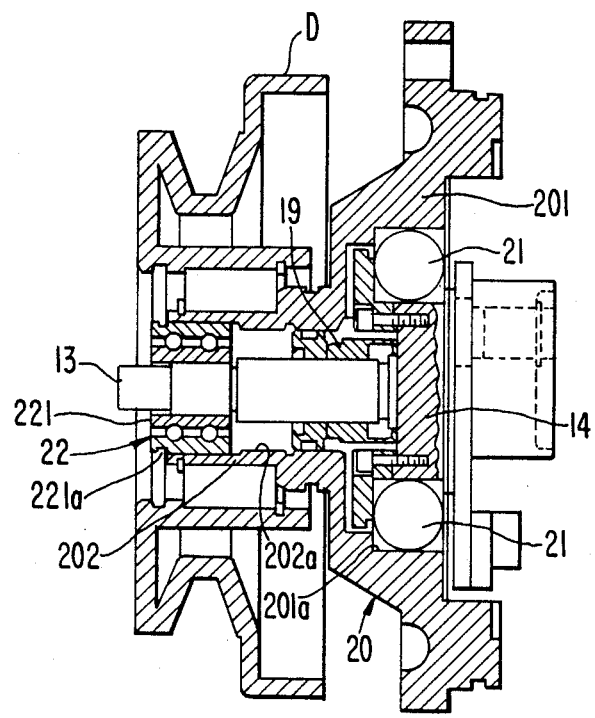
FIG. 2 is a cross-sectional view of a front casing which constitutes part of a compressor housing and encloses radial bearings for supporting a drive shaft in accordance with a preferred embodiment of this invention.

FIG. 2 best illustrates the improvement embodied in the present invention. Front or second casing 20 is designed to cooperate with a first or rear casing, such as a casing analogous to casing 12 of FIG. 1, to form a compressor housing therewith. The first casing has an opening at one end to permit drive shaft 13 which is driven by drive mechanism D. However, for purposes of simplification, the first casing is not shown in FIG. 2.

Drive mechanism D drives the driven end of drive shaft 13 through a mechanism such as an electromagnetic clutch. Electromagnetic clutches are well known. The electromagnetic clutch disclosed in U.S. Pat. No. 4,632,236 is merely representative of the many designs available. Furthermore, electromagnetic clutches are merely referred to for illustrative purposes only as a great variety of drive mechanisms may obviously be used to drive shaft 13.

The first casing has an opening at one end thereof to permit drive shaft 13, supported in second casing 20, to drive the compression mechanism enclosed in the first casing. Second casing 20 encloses that opening when second casing 20 is coupled to the first casing.

Front or second casing 20 includes front end plate portion 201, which supports first bearing 21, and tubular front boss portion 202, which supports second bearing 22. First bore 201a is formed within front end plate portion 201 at the center thereof and second bore 202a is formed within tubular front boss portion 202 to communicate with first bore 201a. Drive shaft 13 extends into front casing 20, through second bore 202a and into first bore 201a. An inner surface of front end plate portion 201 defines first bore 201a and supports first radial bearing 21. Bearing 21 rotatably supports annular disc 14 of drive shaft 13. The other end of drive shaft 13, the driven end, is also rotatably supported within front casing 20. An inner surface of tubular front boss portion 202 defines second bore 202a and supports second radial bearing 22. Second bearing 22 rotatably supports the driven end of shaft 13. Shaft seal mechanism 19 is disposed on the outer surface of drive shaft 13 and between bearings 21 and 22. Shaft seal mechanism 19 extends from first bore 201a into second bore 201b and provides a seal between shaft 13 and tubular boss portion 202 to prevent refrigerant gas and lubricating oil from leaking to the outside of the compressor housing through both bores 201a and 202a and bearing 22.

Radial bearing 22 is positioned in front casing 20 so that end portion 221 of bearing 22 is exposed to the outside of front casing 20. Annular groove 221a is formed on the outer surface of exposed portion 221. The annular groove 221a is formed on the outer radial surface of the bearing 22 by a pair of annular shoulders. Accordingly, replacement of radial bearing 22 is easily made by using a jig, such as a bearing puller which grips bearing 22 by annular groove 221a. Therefore, in the above compressor housing, it is not necessary to remove the casing, which supports bearing 22, from the bearing before pulling the bearing off of shaft 13. Consequently, shaft seal mechanism 19 may be replaced without separating the first and second casings, thereby reducing maintenance costs and simplifying shaft seal mechanism replacement.

An annular groove having a width of 0.5 mm and a depth of 1.5 mm to 0.1 mm provides appropriate gripping power for a bearing puller when removing radial bearings from drive shafts of the above described compressors.

Although the invention has been described in detail with respect to the accompanying drawings, it is to be understood that the invention is not limited thereto and that various changes and modifications may be effected therein by one skilled in the art without departing from the scope of the invention.

We claim:

1. In a compressor including a housing comprising a first casing for enclosing a compression mechanism and a second casing releasably attached to one end of said first casing, said second casing supporting a pair of bearings which rotatably support a drive shaft, a first one of said bearings being adjacent said first casing and the second bearing being spaced therefrom toward the driven end of said drive shaft, sealing means disposed about said drive shaft and between said bearings for sealing said housing and preventing refrigerant or lubricating oil from leaking therefrom, the improvement comprising:

said second bearing having gripping means for gripping said second bearing when removing said second bearing from said drive shaft so that said sealing means may be replaced without separating said first and second casings, wherein said gripping means is formed by a deviation in the outermost radial surface of said second bearing.

2. The compressor of claim 1 wherein said gripping means is outside of said second casing.

3. The compressor of claim 2 wherein said gripping means comprises an annular groove.

4. The compressor of claim 3 wherein said annular groove has a width of 0.5 mm and a depth within the range and inclusive of 1.4 mm to 1.6 mm.

5. The compressor of claim 3 wherein said second casing comprises a first portion defining an end plate for association with said first casing and a second portion having a reduced inner diameter with respect to that of said first portion, said second portion surrounding said second bearing and being integrally formed with said first portion.

6. The compressor of claim 2 wherein said second casing comprises a first portion defining an end plate for association with said first casing and a second portion having a reduced inner diameter with respect to that of said first portion, said second portion surrounding said second bearing and being integrally formed with said first portion.

7. The compressor of claim 1 wherein said gripping means comprises an annular groove.

8. The compressor of claim 7 wherein said annular groove has a width of 0.5 mm and a depth within the range and inclusive of 1.4 mm to 1.6 mm.

9. The compressor of claim 7 wherein said second casing comprises a first portion defining an end plate for association with said first casing and a second portion having a reduced inner diameter with respect to that of said first portion, said second portion surrounding said second bearing and being integrally formed with said first portion.

10. The compressor of claim 1 wherein said second casing comprises a first portion defining an end plate for association with said first casing and a second portion having a reduced inner diameter with respect to that of said first portion, said second portion surrounding said second bearing and being integrally formed with said first portion.

11. The compressor of claim 1 wherein said gripping means is spaced equidistantly around said second bearing.

12. A bearing assembly comprising:
a housing; and
a bearing supported by said housing for rotatably supporting a shaft, said bearing having receiving means for receiving a bearing removal device to pull said bearing from said shaft and said housing, said receiving means comprising an annular shoulder formed on a portion of said bearing external to said housing, said bearing being mounted in said housing so that while a portion of said bearing is inside said housing, one end of said shaft and at least the portion of said bearing containing said annular shoulder are disposed outside said housing with said annular shoulder being spaced from said housing.

13. The bearing assembly of claim 12 wherein said annular shoulder is formed by an annular groove on the outermost radial surface of said bearing.

14. The bearing assembly of claim 12 wherein said one end of the shaft and said receiving means are adjacent one side of said housing and the other end of said shaft is disposed inside said housing.

15. The bearing assembly of claim 12 wherein said bearing is a radial bearing.

* * * * *